Patented Jan. 5, 1943

2,307,702

UNITED STATES PATENT OFFICE 2,307,702

α-1-NAPHTHYL CINNAMIC NITRILE AS A PEST-CONTROL AGENT

William Moore, Stamford, Conn., assignor to American Cyanamid Company, New York, N. Y., a corporation of Maine No Drawing. Application March 25, 1941, Serial No. 385,139

1 Claim. (Cl. 167—30)

The present invention relates to a pest-control agent and more particularly to a compound which is especially effective as a contact poison for the control of insects and allied pests.

The invention is based upon the discovery that α-1-naphthyl cinnamic nitrile possesses strong insecticidal activity against sucking and soft-bodied insects which are particularly difficult to exterminate, for example the citrus red spider, *Tetranychus citri*, and the bean aphid, *Aphis rumicis*, and that such activity is attained without any substantial harmful or deleterious action on the vegetation infested with the insect.

The following example illustrates a specific method of preparing the above compound in accordance with the invention. Materials employed are in parts by weight.

Example

To a mixture consisting of 10 parts of 1-naphthyl acetonitrile and 6.4 parts of benzaldehyde there were added 2 parts of a 5% solution of sodium hydroxide in ethyl alcohol. After standing at room temperature (20° C.) for 24 hours, the reaction product was dissolved in ether, washed neutral (0.05% $H_2SO_4$), dried over sodium sulfate and distilled at reduced pressure. The α-1-naphthyl cinnamic nitrile was recovered as a viscous yellow oil boiling at 240° C. at less than 1 mm. pressure.

Spray solutions were prepared by dissolving the α-1-naphthyl cinnamic nitrile in a solvent medium consisting of 65% acetone and 35% water. A 98.7% control was obtained when a spray of 1–500 dilution was used against the citrus red spider, *Tetranychus citri*. At the same dilution the insecticide gave a 77% control on the bean aphid, *Aphis rumicis*.

Although the compound of this invention is especially effective as a contact poison for the control of insect pests, it may also be used for fungicidal and bactericidal purposes.

This new insecticide may be applied in any of the conventional manners. Thus, for example, it may be used in an aqueous emulsion or incorporated in organic liquids such as the aliphatic and aromatic hydrocarbons for spraying purposes, or it may be effectively used in dusts with such inert solid diluents as kieselguhr, wood flour, walnut shell, talc, and the like.

While the invention has been described with particular reference to specific embodiments, it is to be understood that it is not to be limited thereto but is to be construed broadly and restricted solely by the scope of the appended claim.

I claim:

An insecticide containing as an active ingredient α-1-naphthyl cinnamic nitrile.

WILLIAM MOORE.